(12) United States Patent
Shimizu

(10) Patent No.: US 12,384,473 B2
(45) Date of Patent: Aug. 12, 2025

(54) VEHICLE WITH UNDERCOVER

(71) Applicant: SUBARU CORPORATION, Tokyo (JP)

(72) Inventor: Satoshi Shimizu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 342 days.

(21) Appl. No.: 18/088,349

(22) Filed: Dec. 23, 2022

(65) Prior Publication Data

US 2023/0278649 A1    Sep. 7, 2023

(30) Foreign Application Priority Data

Feb. 1, 2022  (JP) .................................. 2022-014183

(51) Int. Cl.
*B62D 35/02*   (2006.01)
*B62D 25/20*   (2006.01)

(52) U.S. Cl.
CPC ............. *B62D 35/02* (2013.01); *B62D 25/20* (2013.01)

(58) Field of Classification Search
CPC ....... B62D 35/005; B62D 35/02; B62D 25/20
USPC .......................................... 296/180.1, 180.2
See application file for complete search history.

(56) References Cited

U.S. PATENT DOCUMENTS

| | | | | |
|---|---|---|---|---|
| 5,322,340 A | * | 6/1994 | Sato ................... | B62D 25/2036 296/180.1 |
| 5,511,847 A | * | 4/1996 | Weisbarth .............. | B60C 23/18 296/180.1 |
| 8,668,245 B2 | * | 3/2014 | Kakiuchi ............... | B62D 35/02 296/180.1 |
| 10,457,341 B2 | * | 10/2019 | Riggs ..................... | B62D 35/02 |
| 10,814,922 B2 | * | 10/2020 | Mandl .................... | B62D 35/02 |
| 11,072,370 B2 | * | 7/2021 | Koeppe .................. | B62D 21/15 |
| 11,794,825 B2 | * | 10/2023 | Ambo .................... | B62D 37/02 |
| 11,827,285 B2 | * | 11/2023 | Grebel ................... | B62D 35/02 |
| 2014/0070564 A1 | * | 3/2014 | Bernard ............... | B62D 35/001 296/180.3 |
| 2015/0008698 A1 | * | 1/2015 | Reisenhofer ....... | B62D 25/2072 296/180.1 |
| 2022/0324523 A1 | * | 10/2022 | Uno ..................... | B62D 35/005 |

FOREIGN PATENT DOCUMENTS

JP   2012-136062 A   7/2012
JP   2017-065445 A   4/2017

* cited by examiner

*Primary Examiner* — Jason S Daniels
(74) *Attorney, Agent, or Firm* — MCGINN I.P. LAW GROUP, PLLC

(57) ABSTRACT

A vehicle includes an undercover that covers at least from a lower part of a grille to a rear end of a front wheel of a floor undersurface of a vehicle body. The undercover includes a first slope and an opening. The first slope slopes vertically downward from a front side toward a rear side of the vehicle. The opening is disposed on a rear side of the front wheel. A space for guiding air toward the rear side of the front wheel is provided between the undercover and a drive power mechanism that is mounted on a front part of the vehicle body.

12 Claims, 8 Drawing Sheets

FIG. 6A
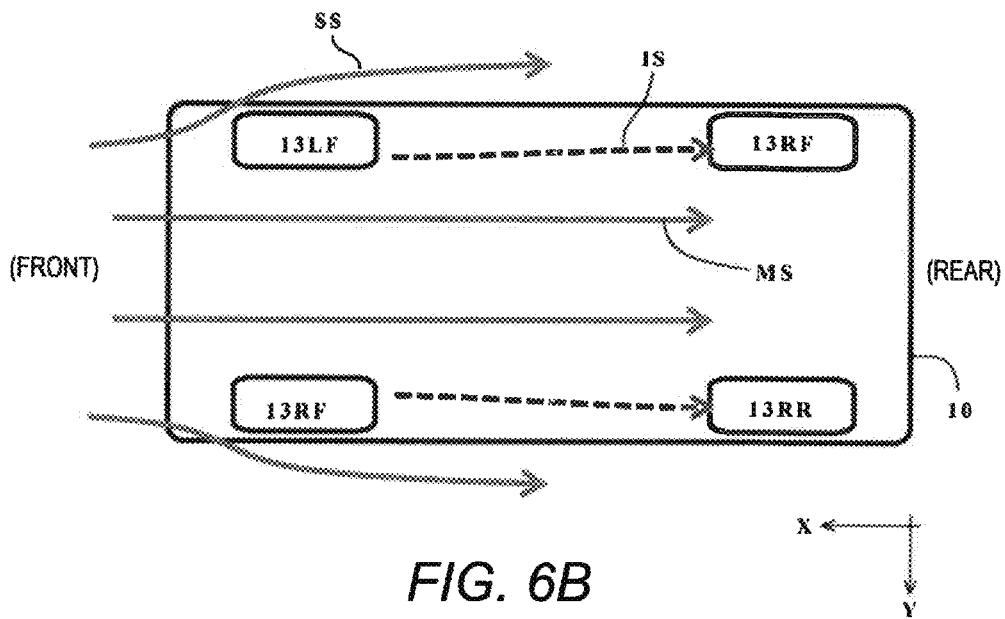
FIG. 6B
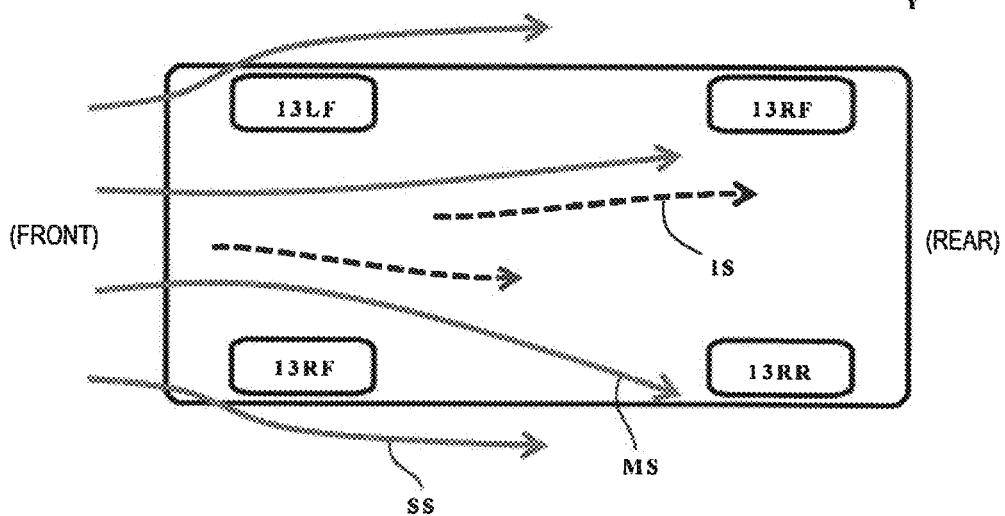
FIG. 6C
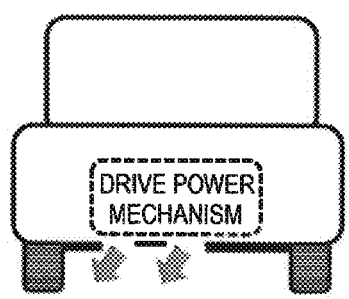
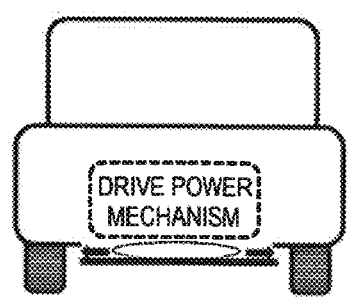
<<RELATED-ART STRUCTURE>>    <<PRESENT EMBODIMENT>>

VEHICLE WITH UNDERCOVER

CROSS-REFERENCE TO RELATED APPLICATIONS

The present application claims priority from Japanese Patent Application No. 2022-014183 filed on Feb. 1, 2022, the entire contents of which are hereby incorporated by reference.

BACKGROUND

The disclosure relates to a vehicle mounted with an undercover that guides air flowing under a floor of the vehicle.

In recent years, for the purpose of guiding air that flows under a floor of a vehicle, such as a four-wheeled vehicle, an undercover may be placed to cover the underside of the floor of the vehicle. For such undercovers, various kinds of structures have been devised in order to make an airflow smoothly flow under a floor of a vehicle.

In one example, Japanese Unexamined Patent Application Publication (JP-A) No. 2017-65445 discloses an undercover for guiding an airflow that flows from a front side of an automobile to a lower side of a floor member, to a rear side of the automobile. This undercover extends in the front-rear direction along the floor member and includes a guide wall in which a rear end part is disposed rearward of a front tire between a side and a tunnel part of the automobile.

In another example, JP-A No. 2012-136062 discloses a structure for improving cooling performance of an engine room. This structure has a cut part (recess) at a center part of an undercover, and it makes air that flows in a space under an engine, go down to a lower side of the undercover via the cut part, to join travel wind Fu flowing under the undercover.

SUMMARY

An aspect of the disclosure provides a vehicle. The vehicle includes an undercover that covers at least from a lower part of a grille to a rear end of a front wheel of a floor undersurface of a vehicle body. The undercover includes a first slope and an opening. The first slope slopes vertically downward from a front side toward a rear side of the vehicle. The opening is disposed on a rear side of the front wheel. A space for guiding air toward the rear side of the front wheel is provided between the undercover and a drive power mechanism that is mounted on a front part of the vehicle body.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

FIGS. 6A to 6C are schematic views of airflows that flow under a floor (an undercover) of a vehicle.

DETAILED DESCRIPTION

Figure 1:
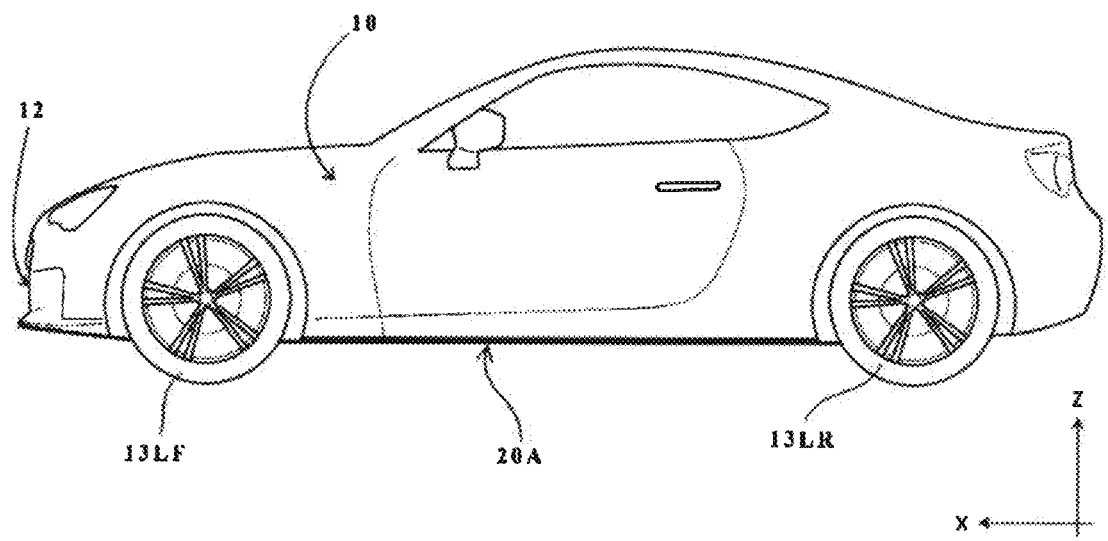
FIG. 1 is a side view of a vehicle mounted with an undercover of an embodiment.

Existing techniques, including the above-described Patent Literatures, do not suitably satisfy the needs of markets, and there are drawbacks as described below.

In one example, in each of the above-described Patent Literatures, an airflow that enters an engine room via a front grille generally flows to a lower side of an undercover from a center part of the underside of a floor, as disclosed in, for example, JP-A No. 2012-136062. The airflow that flows to the lower side of the undercover joins, for example, a main stream of travel wind flowing from a front side of a vehicle to the lower side of the undercover. In this manner, air flows downward from an engine room and joins a main stream of travel wind under a floor. This air reduces an effect of negative pressure under the floor generated by the main stream of travel wind and consequently acts in a direction in which a front part of the vehicle rises, whereby the Cl value is decreased. In addition, the air that flows from the engine room to the lower side of the floor hardly becomes uniform in the vehicle width direction and causes a lateral difference in flow rate at the time the air joins the main stream of travel wind. Thus, deviation occurs in distribution of pressure under the floor and makes yaw modes and roll modes on right and left sides of the vehicle different from each other. Moreover, the flow, which flows from the engine room and joins the main stream of travel wind under the floor, subsequently generates flows that go also to rear wheels of the vehicle, whereby the Cd value of the vehicle is also decreased.

It is desirable to provide a vehicle mounted with an undercover that is configured to prevent a flow flowing from an engine room and a main stream of travel wind from joining together under a floor of the vehicle and to make the main stream of travel wind smoothly flow rearward of the vehicle, thereby improving both of the Cl value and the Cd value of the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. It should be noted that elements other than those detailed below may be supplemented with, for example, publicly known vehicle structures and undercovers, including elements disclosed in the above-described JP-A Nos. 2017-65445 and 2012-136062, as appropriate.

First Embodiment

A vehicle 100 that is mounted with an undercover 20A according to a first embodiment will be described by using FIGS. 1 to 5. In this embodiment, the vehicle 100 is exemplified by a four-wheel drive vehicle in which a drive torque that is output from a publicly known drive power source 30 is transmitted to a left front wheel 13LF, a right front wheel 13RF, a left rear wheel 13LR, and a right rear wheel 13RR. Hereinafter, among these wheels, the front wheel is denoted by "13F", and the rear wheel is denoted by "13R". The vehicle 100 in the disclosure is not limited to the four-wheel drive vehicle as described above and may be a publicly known front-wheel drive vehicle or rear-wheel drive vehicle.

Each type of vehicle can be employed as the vehicle 100 of this embodiment on the condition that a part of a cooling system, such as a radiator, is mounted at a front part of the vehicle 100 and that travel wind entering from, for example, a front grille, flows to a lower side of a floor of the vehicle 100. A drive power source 30, which will be described later, may not be mounted at the front part. From this point of view, for example, even a rear-engine vehicle in which the drive power source 30 is not disposed at the front part of the vehicle 100, unlike the structure illustrated in the drawing, can be used as a vehicle 100 suitable for this embodiment, on the condition that a radiator being a part of a drive power mechanism is disposed at the front part.

In the vehicle 100 of this embodiment, a driving force from the drive power source 30, which is placed in an engine room at a front part of the vehicle, is transmitted to a front wheel drive shaft 17F via a transmission and a front wheel differential mechanism and a rear wheel drive shaft 17R via the transmission, a propeller shaft 19, and a rear wheel differential mechanism 18. The transmission and the front wheel differential mechanism are not illustrated in the drawings.

The drive power source 30 can use a publicly known internal combustion engine, such as a gasoline engine or a diesel engine. Although this embodiment describes a gasoline engine as an example of the drive power source 30, the drive power source 30 of this embodiment may be a drive motor and may include both of an internal combustion engine and a drive motor. In this embodiment, the above-described drive power source 30 and the transmission (power transmission mechanism), and a heat exchanger (radiator) that exchanges heat with the drive power source 30, together, constitute the drive power mechanism.

Driving of each of the drive power source 30 and the transmission is controlled by a vehicle control device that includes one or more publicly known electronic control units (ECU).

A front end of a body 10 of the vehicle 100 is provided with a publicly known grille 12, and travel wind for cooling the radiator and so on can enter the engine room via the grille 12.

Figure 2:
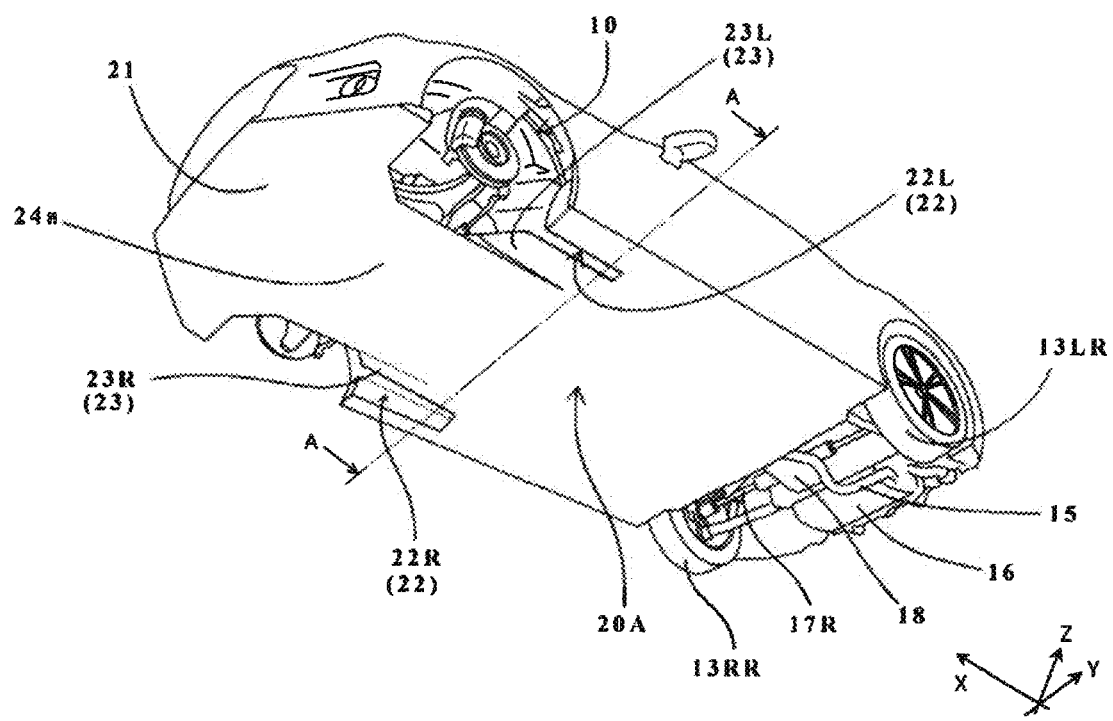
FIG. 2 is a schematic bottom perspective view of the vehicle mounted with the undercover of the embodiment.

As illustrated in FIGS. 1 and 2, the body 10 has a floor undersurface 11 on which a publicly known exhaust pipe 15 for discharging exhaust gas from the gasoline engine to a rear side of the vehicle, a publicly known muffler 16 coupled to the exhaust pipe 15, etc. are placed.

Moreover, in the vehicle 100 of this embodiment, the floor undersurface 11 of the body 10 is provided with an undercover 20A for rectifying an airflow on the lower side. In addition, as described later, a space SP (refer to FIG. 7) for guiding air to rear sides of the front wheels 13F is provided in the engine room of this embodiment, between the drive power mechanism (e.g., the drive power source 30 and the transmission) mounted on the body 10, the floor undersurface 11, the muffler 16, etc. and the undercover 20A.

The structure of the undercover 20A of this embodiment will be described in detail hereinafter.

<Undercover 20A>

As illustrated in FIGS. 1 to 5, the vehicle 100 of this embodiment includes an undercover 20A that covers at least from a lower part of the grille 12 to front ends of the rear wheels 13R of the floor undersurface 11 of the body 10.

For example, the undercover 20A of this embodiment has a front area FA including a first slope 21, a middle area MA including openings 22, and a rear area RA that is coupled to a rear part of the middle area MA to cover from a vehicle front side to the front ends of the rear wheels 13R. The first slope 21 and the openings 22 will be described later.

Figure 3:
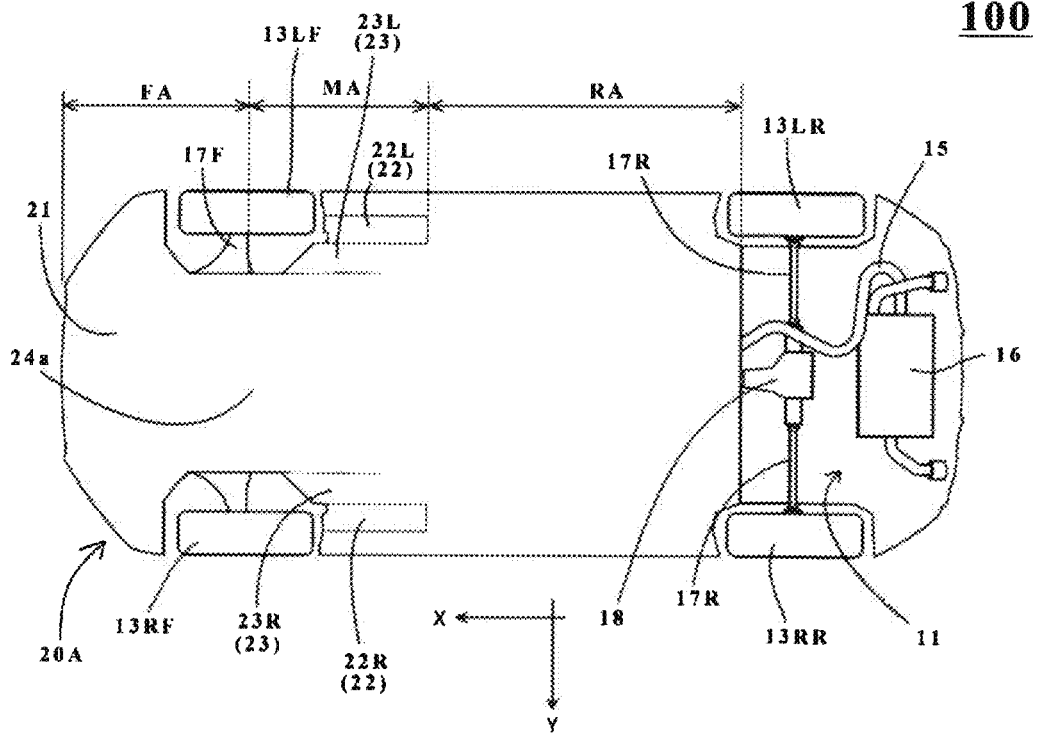
FIG. 3 is a bottom view of the vehicle mounted with the undercover of the first embodiment.
Figure 4:
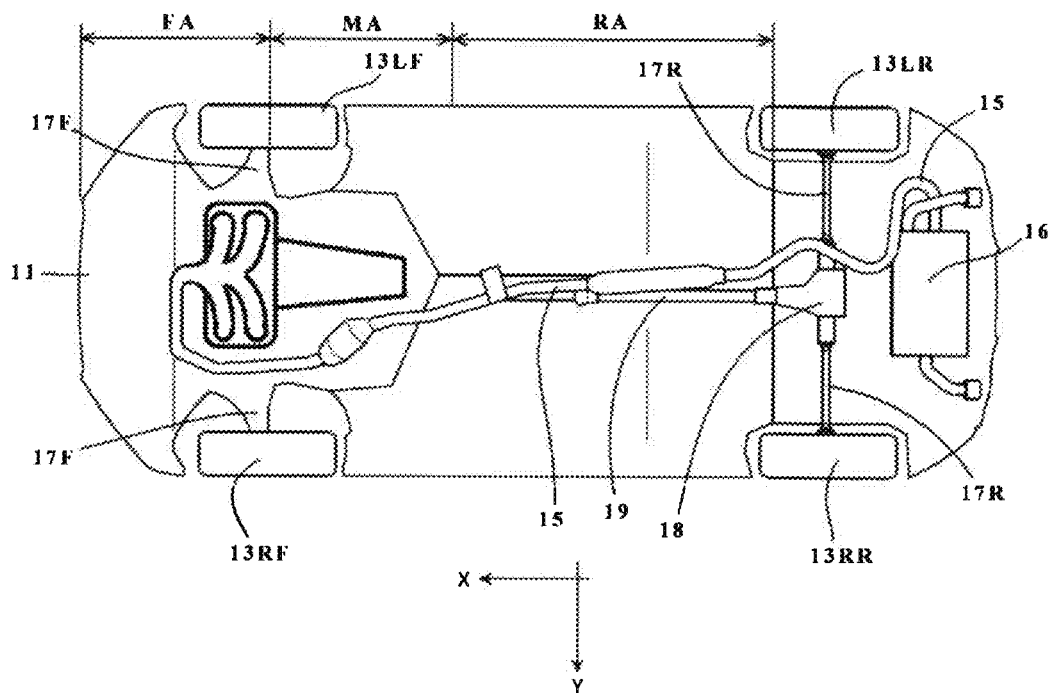
FIG. 4 is a bottom view of the vehicle from which the undercover is removed.

As illustrated in FIGS. 1 and 3 and so on, the undercover 20A includes a first slope 21 that slopes vertically downward from the vehicle front side toward the vehicle rear side, in the front area FA. The undercover 20A, which includes the first slope 21 in this manner, compresses an airflow that flows from the front side of the vehicle 100 along a lower side of the undercover 20A and thereby increases the flow rate of the airflow during traveling of the vehicle 100. Thus, negative pressure acts on the lower side of the undercover 20A of the vehicle 100, and a force for pulling the vehicle 100 vertically downward is generated, whereby the Cl value of the vehicle 100 is improved.

Although the first slope 21 has a linearly sloped shape in a side view of the vehicle 100 in the drawing, the shape is not limited thereto. The first slope 21 may have a slope shape that is curved so as to protrude vertically downward from the vehicle front side toward the vehicle rear side.

Figure 5:
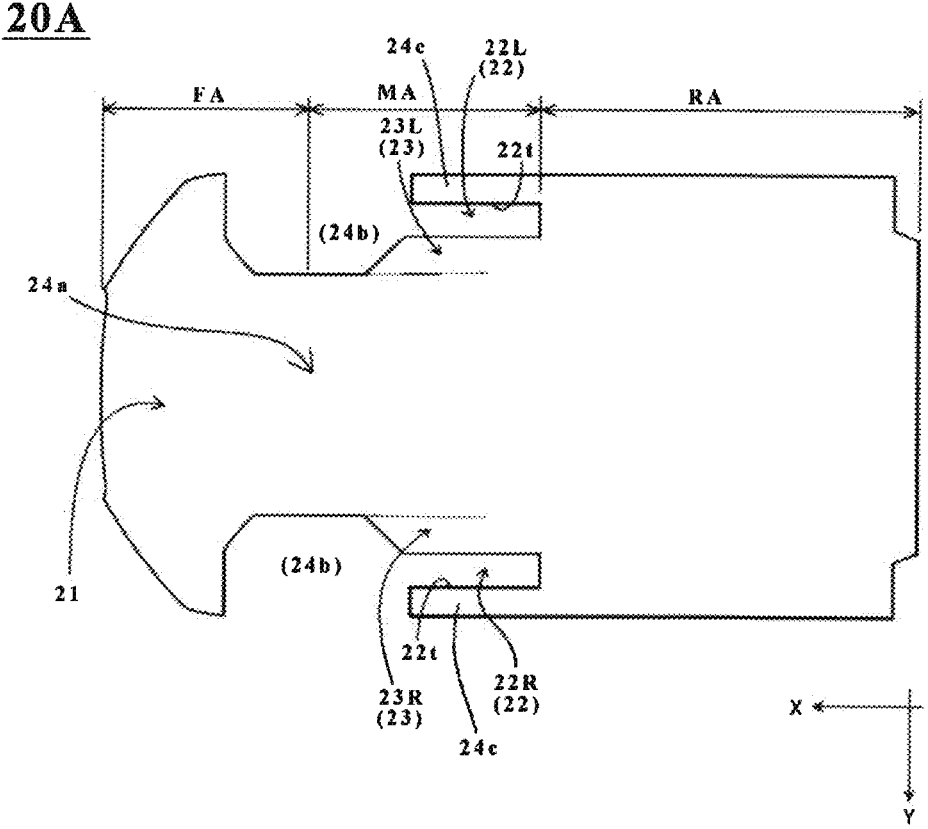
FIG. 5 is a schematic view illustrating the undercover of the embodiment.

As illustrated in FIGS. 3 and 5 and so on, the undercover 20A includes openings 22 that are disposed on rear sides of the front wheels 13F, in the middle area MA. For example, the middle area MA of the undercover 20A is provided with a main surface part 24a, which continues from the first slope 21, and tire house regions 24b, in which the left front wheel 13LF and the right front wheel 13RF are respectively disposed.

As illustrated in the drawings, the main surface part 24a of this embodiment is provided continuously to the rear area RA, as described above. In some embodiments, the first slope 21 and the main surface part 24a are formed into one body. However, these may be made of separate members and may be joined together via publicly known fixing units. Alternatively, a part of other publicly known vehicle part, such as a front bumper or a side sill spoiler, may constitute the first slope 21, a second slope 23, or the main surface part 24a, in the condition of being attached to the vehicle 100.

In other words, in the undercover 20A of this embodiment, for example, each of the first slope 21, the second slope 23, and the main surface part 24a may be constructed as a part of a publicly known vehicle part that is attachable to the publicly known vehicle 100.

The openings 22 of this embodiment include a right opening 22R, which is disposed rearward of the right front wheel 13RF continuously with the tire house region 24b, and a left opening 22L, which is disposed rearward of the left front wheel 13LF continuously with the tire house region 24b. As clearly illustrated in FIG. 5 and so on, in some embodiments, the openings 22 of the undercover 20A are disposed on rear sides of right and left tires of the vehicle 100 so as to be symmetric about the center in the vehicle width direction of the vehicle 100.

As illustrated in FIGS. 3 and 5 and so on, the undercover 20A of this embodiment may also include second slopes 23 that are disposed inward (on the vehicle center side) of the openings 22 in the vehicle width direction (Y direction in the drawings) of the vehicle 100, in the middle area MA.

For example, the middle area MA of the undercover 20A may include a right second slope 23R and a left second slope 23L. The right second slope 23R is disposed between the right opening 22R and an inner edge of the tire house region 24b in the vehicle width direction. The left second slope 23L is disposed on a rear inner side of the left front wheel 13LF, between the left opening 22L and an inner edge of the tire house region 24b in the vehicle width direction.

The second slope 23 of this embodiment is disposed so as to be approximately at the same position as the opening 22, on a rear side of the tire house region 24b in the vehicle longitudinal direction (X direction), in the state in which the undercover 20A is mounted to the vehicle 100. The second slope 23 has a shape that slopes vertically downward from the vehicle front side toward the vehicle rear side.

In the undercover 20A having the second slopes 23 described above, the second slope 23 captures a flow that is accelerated by the first slope 21, rushes into the tire house region 24b, and then diffuses while decelerating, during traveling of the vehicle 100. This prevents the flow, which is accelerated by the first slope 21, from entering the tire house region 24b and accelerates the flow again under the undercover 20A.

Although the second slope 23 has a linearly slope shape in a side view in the drawing, the shape is not limited thereto. The second slope 23 may have a slope shape that is curved so as to protrude vertically downward from the vehicle front side toward the vehicle rear side.

The flow can be prevented from entering the tire house because the rear side of the front wheel 13F is in a relatively negative pressure state due to effects of the front wheel 13F, during traveling of the vehicle 100. From such a point of view, the second slope 23 may not be provided and may be omitted in the undercover 20A, as appropriate.

<Functions and Effects of Undercover 20A>

Figure 7:
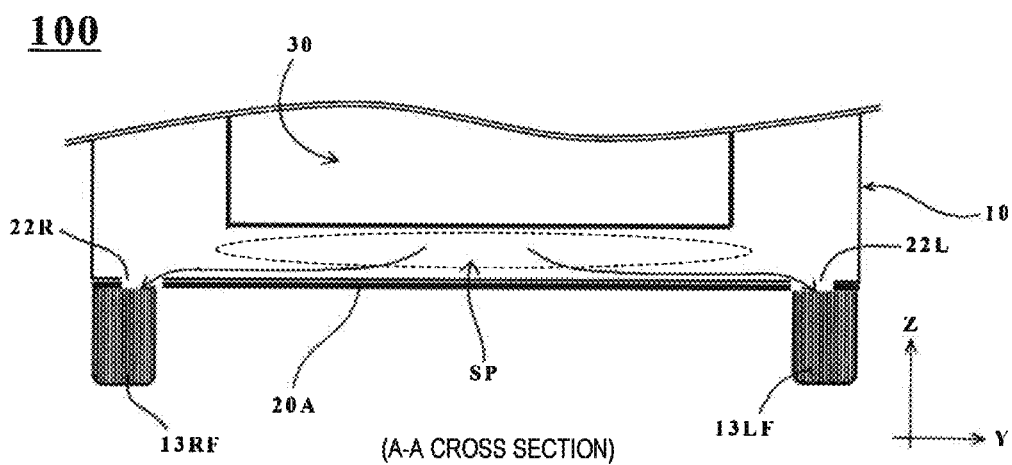
FIG. 7 is a schematic view of airflows that flow from an engine room to a lower side of the undercover.

Next, functions and effects of the undercover 20A during traveling of the vehicle 100 will be described by using FIGS. 6A to 7. FIG. 6A illustrates airflows under the vehicle 100 that is mounted with the undercover 20A of this embodiment, during traveling of the vehicle 100. FIG. 6B illustrates airflows under a vehicle that is mounted with an undercover having a related-art structure, as disclosed in the above-described Patent Literatures, during traveling of the vehicle 100. FIGS. 6A and 6B illustrate an airflow flowing from a vehicle front side to a vehicle lower side by a solid line "MS", an airflow flowing from an engine room to the vehicle lower side by a dotted line "IS", and an airflow flowing to a side surface of the vehicle by a solid line "SS".

In some cases, in the engine room having a related-art structure, a drive power mechanism, such as an engine, may not be disposed in a laterally symmetrical manner. Thus, as illustrated in FIG. 6C, flows that go out to a lower side of a floor of the vehicle can be asymmetric about the center of the vehicle in the vehicle width direction.

As illustrated in FIG. 6A, in the undercover 20A of this embodiment, airflows (also called "travel wind") flowing from the vehicle front side to the vehicle rear side are generated around the vehicle 100 that is traveling. In this case, the travel wind is roughly divided into side streams SS, which separate to both sides of the vehicle 100, and flows (omitted in the drawing) that go to an upper side and a lower side of the vehicle 100 and that enter a front grille.

Among these airflows, the travel wind that goes and flows under the vehicle 100 is accelerated by the first slope 21 of the undercover 20A and passes through the lower side of the undercover 20A, which is placed on the floor undersurface 11 of the vehicle 100. Thus, the travel wind on the lower side flows from the vehicle front side to the vehicle rear side as a main stream MS. This makes the lower surface of the main surface part 24a of the undercover 20A in a negative pressure state and generates a vertical downward load between the center of the front wheel and the center of the rear wheel of the vehicle 100, whereby the Cl value of the vehicle 100 is improved.

The undercover 20A of this embodiment has the second slope 23. Thus, in this case, the second slope 23 captures a flow that is accelerated by the first slope 21, rushes into the tire house region 24b, and then diffuses while decelerating. The captured flow is accelerated again by the second slope 23 and makes the lower side of the second slope 23 in a relatively negative pressure state. In this manner, this embodiment makes it possible to increase the flow rate on the rear side of the front wheel 13F as well as decrease the pressure in the vicinity of the opening 22, and simultaneously to generate an effect of making the lower side of the second slope 23 on the rear inner side of the front wheel 13F, in a relatively negative pressure state.

The undercover 20A of this embodiment, which includes the opening 22, guides air from the space SP between the drive power mechanism (e.g., the drive power source 30, the transmission, and the radiator) and the undercover 20A, to the lower side of the undercover 20A via the opening 22. Thus, this embodiment enables obtaining a path of guiding air from the provided space SP under the drive power source 30 (engine) to the opening 22 by the negative pressure effects of the first slope 21 and the second slope 23. In addition, the space SP of this embodiment serves like a chamber and thus has an effect for preventing generation of the above-described asymmetric flow that goes out from the underside of the floor due to the layout of the drive power mechanism in the engine room.

It should be noted that the second slope 23 may not be provided and may be omitted as appropriate, as described above.

The vehicle 100 of this embodiment has the space SP immediately below the drive power source 30 and also has the opening 22 that is disposed in an area that can be in a relatively negative pressure state. This structure provides an effect for sucking out air in the engine room. This increases air that enters the engine room from the front grille, resulting in an increase in amount of air flowing to the radiator.

The undercover 20A of this embodiment does not have an opening with such a size that allows air to pass through without resistance, immediately below the drive power mechanism (the drive power source 30 and so on), compared with the structure of a related-art undercover. Thus, as illustrated in FIG. 7, air is prevented from flowing out from the space SP under the drive power source 30 (in particular, the vehicle center part) to the main stream MS on the lower side, whereby reducing the main stream MS flowing to the rear wheel 13R, unlike a related-art structure (refer to FIG. 6B). In the state in which the air is prevented from joining the main stream MS immediately below the drive power mechanism, the amount of air flowing to the heat exchanger (radiator) is increased, whereby decrease in the Cd value of the vehicle 100 is prevented, and moreover, effects of variations in outflow of air from the engine room, on the main stream MS, are reduced.

That is, as clearly illustrated in FIG. 6A, in the vehicle 100 having the undercover 20A of this embodiment, an airflow toward the rear wheel 13R is a flow that flows from the engine room via the opening 22, and this airflow via the opening 22 is slow relative to the vehicle 100. Thus, decrease in the Cd value of the vehicle 100 is greatly reduced.

The vehicle 100 having the undercover 20A of this embodiment described above provides the following functions and effects.

(1) Acceleration of the main stream MS makes approximately the whole area under the floor between the center of the front wheel and the center of the rear wheel of the vehicle 100, in a relatively negative pressure state, which greatly improves the Cl value of the vehicle 100.

(2) The negative pressure effects of the rear side of the tire and the second slope 23 increase the amount of air flowing to the heat exchanger (radiator) and make an airflow subjected to heat exchange be discharged via the opening 22 behind the tire. This prevents a decrease in the Cd value of the vehicle 100.

(3) A phenomenon of disturbing the main stream MS by an asymmetric flow that flows out from the underside of the floor, which may occur in a related-art structure, is prevented, whereby a lateral difference in the negative pressure effect under the floor of the vehicle 100 is improved.

(4) Also in a case in which a mechanism for adjusting intake of travel wind into an engine room, such as a grille shutter, is equipped, the main stream MS and the flow that flowing out from the engine room do not join together but are separated from each other under the floor of the vehicle 100. Thus, variations in the Cl value, which can occur due to ON/OFF of the grille shutter, are reduced.

Second Embodiment

<Undercover 20B>

Next, an undercover 20B of a second embodiment that can be employed in the vehicle 100 will be described with reference to FIG. 8.

The undercover 20A of the first embodiment includes the second slope 23 on the inner side of the opening 22 (close to the vehicle center). On the other hand, the undercover 20B of this embodiment is characterized mainly by not having the second slope 23.

It should be noted that elements having the same functions as those described above are denoted by the same reference signs and explanations thereof are omitted in the following descriptions, as appropriate.

Figure 8:
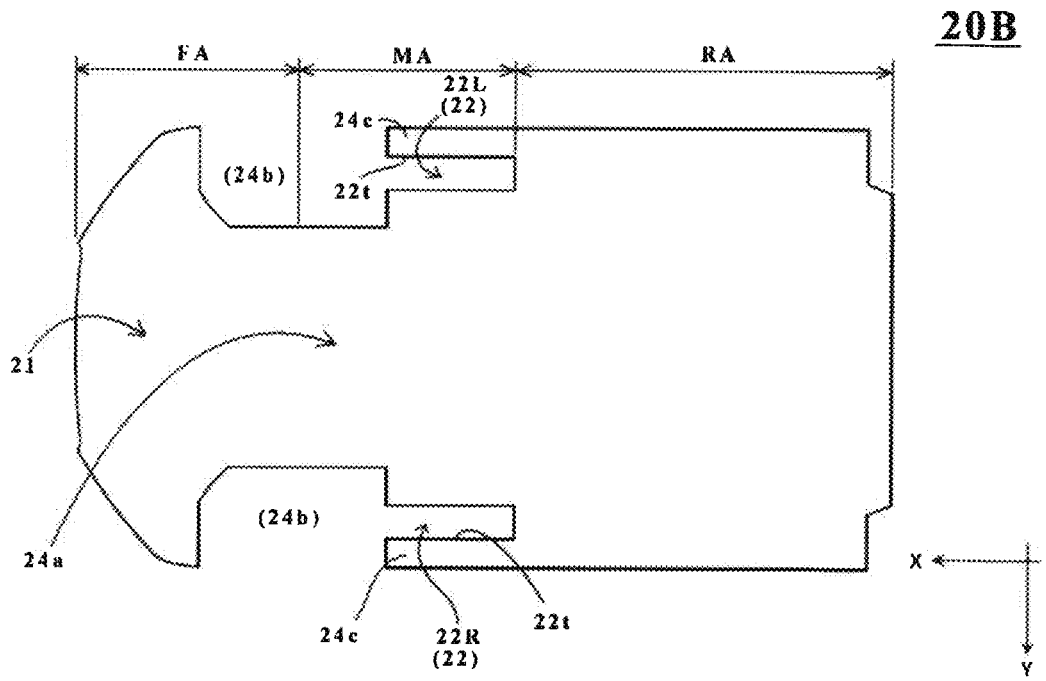
FIG. 8 is a schematic view illustrating an undercover of an embodiment.

In more detail, as illustrated in FIG. 8, the second slope 23 having a predetermined inclination is omitted, and instead, the main surface part 24a continues in the middle area MA of the undercover 20B of this embodiment. In this manner, the second slope 23 may be omitted as appropriate, and instead, the main surface part 24a may be extended, in the disclosure.

Third Embodiment

<Undercover 20C>

Next, an undercover 20C of a third embodiment that can be employed in the vehicle 100 will be described with reference to FIG. 9.

In the undercover 20A of the first embodiment, the width (maximum length in the Y direction of the vehicle width direction) of the front area FA in which the first slope 21 is formed, the width of the middle area MA in which the opening 22 and the second slope 23 are formed, and the width of the rear area RA rearward of the middle area MA, are approximately the same. On the other hand, the undercover 20C of this embodiment is characterized mainly by a width L2 of each of the middle area MA and the rear area RA rearward thereof that is set to be smaller than a width L1 of the front area FA.

Figure 9:
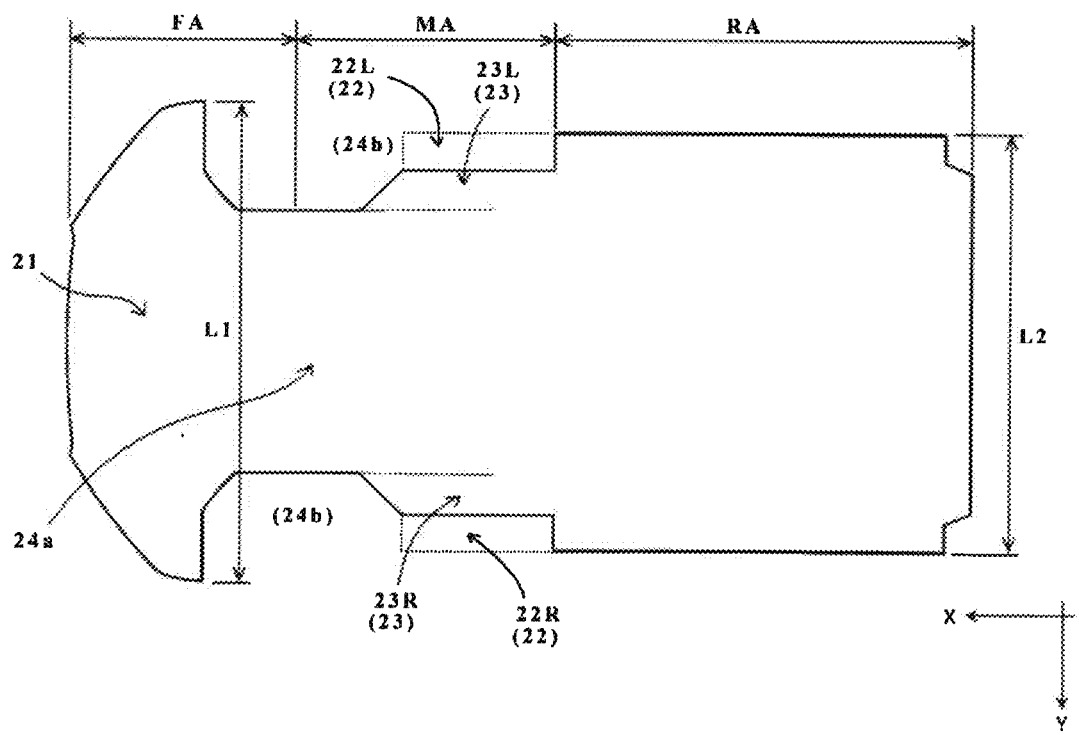
FIG. 9 is a schematic view illustrating an undercover of an embodiment.

In more detail, as illustrated in FIG. 9, a side 22t of the opening 22, which constitutes the main surface part 24a, is not formed, and a bank 24c (refer to FIG. 5) on a side of the opening 22 is omitted, in the undercover 20C of this embodiment. Although the side 22t of the opening 22 is not formed in this manner, air in the engine room under the drive power source 30 flows toward the rear wheel 13R via the opening 22. Thus, the side 22t of the opening 22 may not be provided in the disclosure.

Fourth Embodiment

<Undercover 20D>

Figure 10:
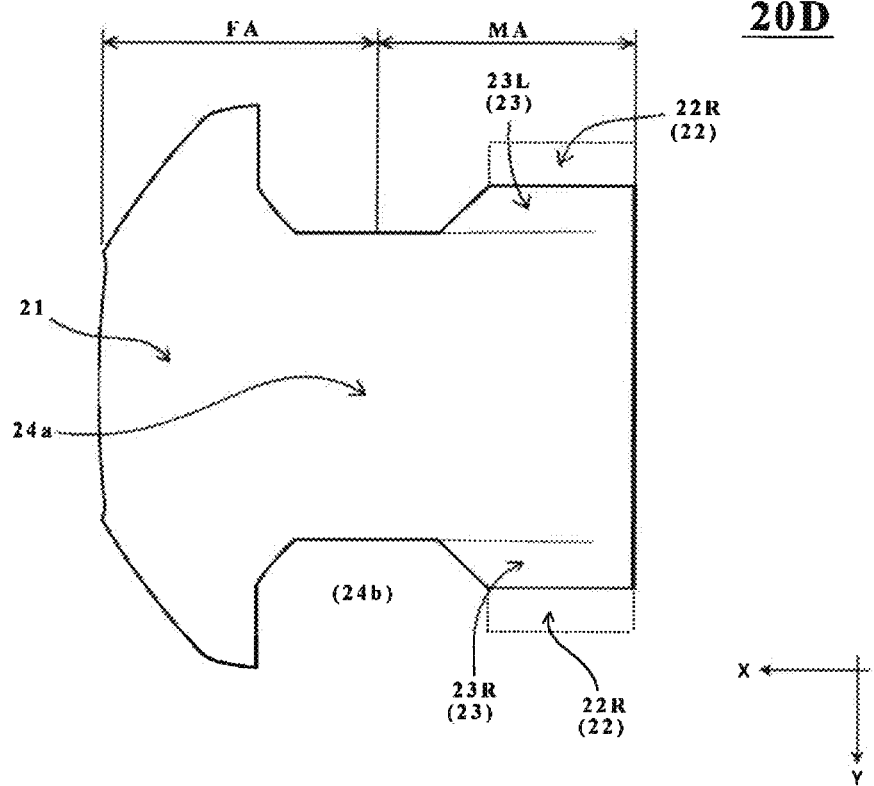
FIG. 10 is a schematic view illustrating an undercover of an embodiment.

Next, an undercover 20D of a fourth embodiment that can be employed in the vehicle 100 will be described with reference to FIGS. 10 and 11.

In the undercover 20A of the first embodiment, the main surface part 24a includes the rear area RA that is continuous with the middle area MA. On the other hand, the undercover 20D of this embodiment is characterized mainly by not having the rear area RA that is coupled to the rear side of the middle area MA.

Figure 11:
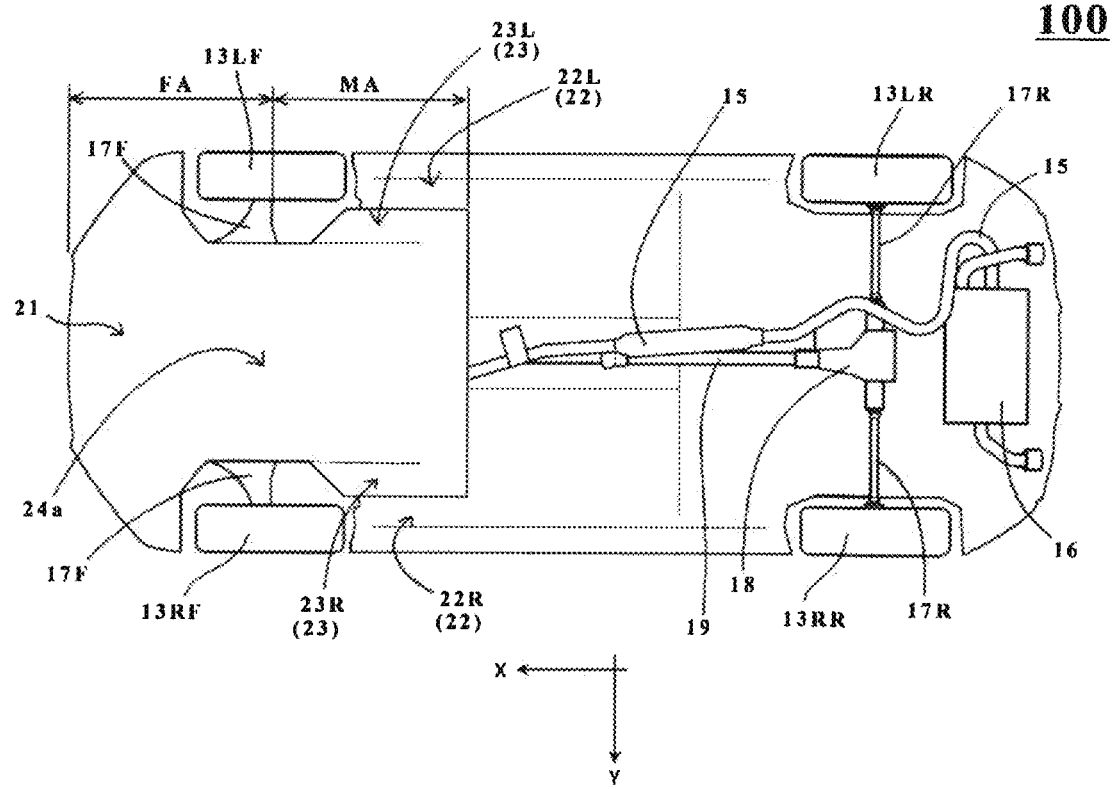
FIG. 11 is a bottom view of a vehicle mounted with the undercover of the embodiment.

In more detail, as illustrated in FIG. 11, the undercover 20D of this embodiment is not formed with the rear area RA but has a main surface part 24a that is approximately half the size of the main surface part 24a of the above-described embodiment. The whole rear area RA may not be omitted, unlike the case illustrated in FIG. 11. That is, the undercover 20D may have an extended part (not illustrated) that covers, for example, at least partially the lower side of the floor and a tank, on the rear side of the middle area MA.

As illustrated in the drawings, the undercover 20C and the undercover 20D of this embodiment can also be presumed to have an opening 22 outside the second slope 23 in the middle area MA. Thus, in the undercover 20D of this embodiment, at least a first area, which covers at least an area immediately below the drive power source 30, and a second area, which is on a side of the first area and corresponds to the second slope 23, are provided as the main surface part 24a, in the middle area MA. In other words, the part that is located on the rear side of the front wheel 13F of the main surface part 24a may be narrower than the vehicle width of the vehicle 100.

Fifth Embodiment

<Undercover 20E>

Next, an undercover 20E of a fifth embodiment that can be employed in the vehicle 100 will be described with reference to FIG. 12.

In the undercover of each embodiment described above, the middle area MA and the rear area RA are configured with the continuous main surface part 24a. On the other hand, the undercover 20E of this embodiment is characterized mainly by a middle area MA that is made of publicly known metal or CFRP being superior to general resin in specific rigidity and by a front area FA and a rear area RA that are made of other material (e.g., general resin material). In this manner, the undercover of the disclosure may be formed of a composite material in which multiple materials having mutually different functions and characteristics are used together.

In more detail, as illustrated in the drawing, the undercover 20E of this embodiment includes a middle area MA formed of a first material, and a front area FA and a rear area RA formed of a second material that is different from the first material. The middle area MA and other areas may be coupled with each other by a publicly known fixing method of each type such as using bolts, bonding, or welding.

In this manner, the undercover 20E is formed of a first material and a second material. The first material is made of metal or CFRP and covers at least a lower side of the drive power mechanism. The second material has a specific rigidity lower than that of the first material and covers an area that is different from the lower side of the drive power mechanism. A material that is superior to a general resin material in specific rigidity (e.g., a metal material or a CFRP material) is used at the lower side of the drive power mechanism, and this material can be relatively thinned, whereby the space under the drive power mechanism can be expanded, while the minimum ground clearance of the vehicle 100 can be sufficiently obtained.

The vehicle 100 between the center of the front wheel and the center of the rear wheel is substantially flat, and therefore, fastening parts of the undercover to the vehicle 100 may be made of resin, and a part under a tunnel of the undercover may be mounted with, for example, an aluminum flat plate. Examples of the fastening parts include a fastening part at the foremost end, which is to be coupled to a front bumper, a fastening part in front of the front tire, which is to be coupled to a mud guard, and a fastening part under a side sill, which is to be coupled to a side sill spoiler.

Figure 12:
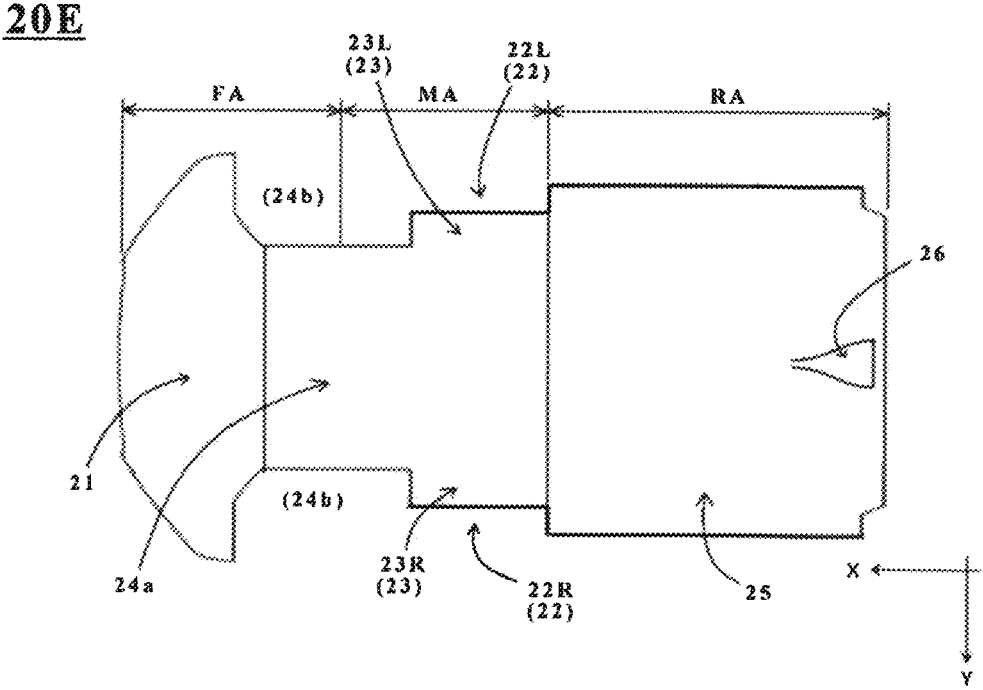
FIG. 12 is a schematic view illustrating an undercover of an embodiment.

In addition, in a case in which a differential gear (so-called a "rear diff") is placed on the rear wheel side of the vehicle 100, the undercover 20E of this embodiment may be provided with an air vent (e.g., a publicly known NACA duct) for allowing travel wind that flows under the undercover 20E, to partially enter the rear diff, as illustrated in FIG. 12. This structure enables improving cooling performance of the rear diff, although the undercover 20E of this embodiment is provided in the vehicle having the rear diff.

The embodiments of the disclosure have been described above with reference to the accompanying drawings. The disclosure is not limited to such embodiments. It is apparent that those skilled in the art would attempt to further modify and alter the above-described embodiments, and it is understood that such modifications and alterations also fall within the technical scope of the disclosure.

The disclosure enables preventing the flow that goes out of the engine room and the main stream of travel wind from joining together under the floor, whereby the main stream of travel wind smoothly flows to the vehicle rear side, resulting in improvements in both of the Cl value and the Cd value of the vehicle.

The invention claimed is:
1. A vehicle comprising:
an undercover that covers at least from a lower part of a grille to a rear end of a front wheel of a floor undersurface of a vehicle body,
wherein the undercover includes:
a first slope that slopes vertically downward from a front side toward a rear side of the vehicle; and
an opening that is disposed with a front end of the opening entirely on a rear side of the front wheel, and
wherein a space for guiding air toward the rear side of the front wheel is provided between the undercover and a drive power mechanism that is mounted on a front part of the vehicle body.
2. The vehicle according to claim 1, wherein the undercover comprises a second slope that is disposed on an inner side of the opening in a vehicle width direction of the vehicle and that slopes vertically downward from the front side toward the rear side of the vehicle.
3. The vehicle according to claim 1, wherein the opening comprises multiple openings that are respectively disposed on a rear side of a right tire and a rear side of a left tire in such a manner as to be symmetric about a center in the vehicle width direction of the vehicle.
4. The vehicle according to claim 1, wherein the undercover is formed of a first material and a second material, the first material being made of metal or CFRP and covering at least a lower side of the drive power mechanism, the second material having a specific rigidity lower than a specific rigidity of the first material and covering an area that is different from the lower side of the drive power mechanism.
5. The vehicle according to claim 1, wherein the undercover compresses an airflow that flows from the front side of the vehicle along a lower side of the undercover and thereby increases a flow rate of the airflow during traveling of the vehicle.
6. The vehicle according to claim 5, wherein the compressed airflow causes a negative pressure acting on the lower side of the undercover of the vehicle, and a force for pulling the vehicle vertically downward is generated.
7. The vehicle according to claim 1, wherein the first slope has a slope shape that is curved so as to protrude vertically downward from the front side toward the rear side of the vehicle.
8. The vehicle according to claim 1, wherein the first slope has a slope shape that is linearly shaped.
9. The vehicle according to claim 1, wherein the opening is provided continuously with a tire house region of the front wheel.
10. A vehicle comprising:
an undercover that covers at least from a lower part of a grille to a rear end of a front wheel of a floor undersurface of a vehicle body,
wherein the undercover includes:
a first slope that slopes vertically downward from a front side toward a rear side of the vehicle; and
an opening that is disposed on a rear side of the front wheel,
wherein a space for guiding air toward the rear side of the front wheel is provided between the undercover and a drive power mechanism that is mounted on a front part of the vehicle body, and
wherein the undercover comprises a second slope that is disposed on an inner side of the opening in a vehicle width direction of the vehicle and that slopes vertically downward from the front side toward the rear side of the vehicle.
11. The vehicle according to claim 10, wherein the second slope has a slope shape that is curved so as to protrude vertically downward from the front side toward the rear side of the vehicle.

12. A vehicle comprising:
an undercover that covers at least from a lower part of a grille to a rear end of a front wheel of a floor undersurface of a vehicle body,
wherein the undercover includes:
   a first slope that slopes vertically downward from a front side toward a rear side of the vehicle; and
   an opening that is disposed on a rear side of the front wheel,
wherein a space for guiding air toward the rear side of the front wheel is provided between the undercover and a drive power mechanism that is mounted on a front part of the vehicle body, and
wherein the undercover is formed of a first material and a second material, the first material being made of metal or CFRP and covering at least a lower side of the drive power mechanism, the second material having a specific rigidity lower than a specific rigidity of the first material and covering an area that is different from the lower side of the drive power mechanism.

\* \* \* \* \*